United States Patent
Pascoe

(10) Patent No.: US 6,236,659 B1
(45) Date of Patent: May 22, 2001

(54) NETWORK CONFIGURATION

(75) Inventor: David John Pascoe, South Perth (AU)

(73) Assignee: 3Com Technologies, Grand Cayman (KY)

( * ) Notice: Subject to any disclaimer, the term of this patent is extended or adjusted under 35 U.S.C. 154(b) by 0 days.

(21) Appl. No.: 08/982,251

(22) Filed: Dec. 1, 1997

(51) Int. Cl.[7] .............................. H04L 12/56; H04L 12/28
(52) U.S. Cl. ........................ 370/404; 370/401; 370/404
(58) Field of Search .................................. 370/401, 402, 370/403, 404, 405, 256, 255, 285, 400, 408

(56) References Cited

U.S. PATENT DOCUMENTS

| | | | |
|---|---|---|---|
| 4,627,052 | * 12/1986 | Hoare et al. ........................... | 370/88 |
| 5,251,213 | * 10/1993 | Videlock et al. ................. | 370/85.12 |
| 5,862,338 | * 1/1999 | Walker et al. ................... | 395/200.54 |
| 5,959,989 | * 9/1999 | Gleeson et al. ....................... | 370/390 |
| 5,963,556 | * 10/1999 | Varghese et al. .................... | 370/401 |
| 6,000,020 | * 12/1999 | Chin et al. ........................... | 711/162 |

* cited by examiner

*Primary Examiner*—Huy D. Vu
*Assistant Examiner*—Toan Nguyen
(74) *Attorney, Agent, or Firm*—Wilson Sonsini Goodrich & Rosati

(57) ABSTRACT

In order to enable utilisation of half-bridges in networks in which a spanning tree algorithm is implemented, the priorities of the half-bridges are set such that generally the half-bridges select which of their ports should be blocked to break any communication loops which arise in preference to full bridges making the selection which may result in communication links via the backbone ports of the half-bridges being disabled. Further, a half-bridge is proposed in which more than one of its ports are available for configuring as the backbone port.

1 Claim, 2 Drawing Sheets

NETWORK CONFIGURATION

FIELD OF THE INVENTION

The present invention relates to computer networks such as local area networks (LANs) and is concerned with establishing proper relationships between the various switching and routing devices, such as bridges, which are present in such a network to ensure proper and efficient use of the network.

BACKGROUND OF THE INVENTION

Computer networks are in general well known and broadly speaking comprise a system by way of which computing devices, such as computers and data storage media, can communicate with each other. The communications system comprises a network of interconnected communication hubs via which communications between the various devices connected to the network travel. There are two well known types of communication hub, repeaters and bridges. Each of these types of devices has a number of ports via which it can receive and transmit communication traffic and therefore by way of which it can be connected either to another communication hub or to a user of the network. The difference between repeaters and bridges is basically in how they handle traffic arriving at their various ports.

A repeater is the simplest form of communication hub and simply retransmits any communication it receives on any one port to all of its other ports. On the simple level therefore it can clearly be seen that if all the users of a network are connected to each other via repeaters it is guaranteed that they will all receive all the communication on the network and therefore will receive all communications intended for themselves. Such an arrangement is however not practical for a useful number of users, because the volume of traffic which is being transmitted to the whole network becomes unreasonably large and cannot be copied by the bandwidth of the communication links.

A bridge on the other hand, when it receives a communication on a particular port, tries to decide if it is necessary to send it to all of its other ports, or if it can ensure that the communication reaches its intended destination by transmitting it from only one or some of its other ports. In a computer network all of the users have assigned to them addresses, and, in a known fashion, a bridge builds up information concerning which of its ports are associated with which users of the network. There are well known ways of building up and ageing out this information to account for reconfiguration of the network, and this aspect does not form a particular part of the present invention. However, it is sufficient to know that it is possible for a bridge to learn information of this type. Therefore, when a bridge receives a communication on one of its ports, it makes an assessment of whether it knows which of its other ports is associated with the intended destination address and forwards the communication only to the relevant port or ports. If the bridge does not have stored in it details of the destination address in question it will forward the communication to all of its other ports in a similar fashion to a repeater. However, in most network protocols, such as Ethernet, each communication must be answered by the intended destination address by an acknowledgement communication. It will therefore be the case that once a bridge has forwarded to all of its ports a communication intended for a destination address it does not yet know it will very shortly receive acknowledgement packet, on the basis of which it can learn about the address in question.

Another type of communication which occurs in such networks is a broadcast communication. This is a communication sent out by a user of the network which is intended to reach an be read by all of the other users. If a bridge receives a broadcast communication it therefore simply retransmits it on all of the other ports.

In network construction it is relatively common to connect the components of the network essentially in a star or tree configuration. In such an arrangement there is only one route between any pair of users. However it is also known to provide secondary or backup communication paths which run in parallel to other communication paths, for instance communication paths which are particularly important to the functioning of the overall network so as to provide resilience in the network in the case of faults. While providing advantages in terms of resilience, such redundant links can cause problems in that there is provided a loop around which communications may travel. It is also possible for loops to occur non intentionally in particular in large networks. Such loops cause particular problems with broadcast communications because such communications are simply forwarded by any communication hub they reach to all of the other ports and therefore the communication may simply be transmitted repeatedly around the loop using up most if not all of the available bandwidth in the loop, consequently making the network unusable for other users.

In the light of this problem it has been proposed to implement a system known as "spanning tree". This will be explained in more detail below, but essentially the spanning tree protocol identifies loops of the type mentioned above which may potentially cause problems and breaks the loops by configuring ports of bridges within the network accordingly. In particular spanning tree can identify one port on a particular bridge forming part of the unwanted loop and can effectively switch off that port to normal communication until such time as a fault occurs in the network and the redundant backup link is required.

There is also proposed a slightly different type of communication hub for use in computer networks which has been designated the "half bridge". In a half bridge, there are a number of ports to which a plurality of local users may be connected, possibly via repeaters or other bridges. These local ports function like the ports described above in bridges in that they learn the addresses of the users connected to them and will only transmit out of those ports communications intended for the known users. Additionally, there is one port in a half bridge which is configured as a backbone or downlink port. This port is connected is to the remainder of the network. A half bridge is distinct from a normal bridge as described above because it does not learn on the designated backbone or downlink port. When a half bridge receives a communication on one of its local ports it decides whether it knows the destination address as being associated with one of its other local ports. If it is it is simply forwarded to the port in question. If the half bridge does not know the destination address in question it assumes that the destination address is on the rest of the network and forwards the communication via the backbone port. A half bridge has advantages over a normal bridge in that it is not necessary for it to learn potentially addresses for all of the users on a large network. This therefore reduces the requirements for the memory in the half bride enabling it to be produced at lower cost.

It has however been found that it is difficult to use a half bridge in a network which is implementing the spanning tree arrangement. Problems can occur if a loop appears in the network which includes the communication link out of the backbone port of a half bridge. This would mean that a second parallel link into the main network had been made via one of the local ports of the half bridge. The spanning tree algorithm would identify this loop and therefore there is a possibility that the spanning tree algorithm would choose the backbone port of the half bridge as the port which should be blocked in order to break the undesirable loop. This would mean that all of the communication to the remainder of the network from the half bridge would be passed via the local port through which the redundant link had been made. Because that local port is set up to learn the addresses associated with it, the half bridge would then be trying to learn the addresses of all the users in the network in the same way as a normal bridge. However a half bridge is not capable of doing this and therefore the performance of the network would drop considerably.

SUMMARY OF THE INVENTION

The present invention provides a communication device for a computer network comprising:
  a plurality of ports to which network devices may be connected and via which communications may be received and transmitted;
  storage means for storing information identifying with which ports of the device known network devices are associated;
  control means for designating one of said plurality of ports as a designated port and for preventing said storage means storing said information relating to said designated port;
  receive means for determining the intended destination or destinations of a communication received on any port and for determining whether or not said destination is one, or all of said destinations are ones, of said known network devices; and
  transmit means for re-transmitting said communication via any port associated with any of said known devices which is an intended destination of said communication and re-transmitting said communication via said designated port if the result of said determination is negative;
  wherein said control means is arranged to select said designated port to be any one of at least a subset of said plurality of ports.

The invention also provides a method of controlling communication traffic in a computer network,
  the network comprising:
    a plurality of network devices and a plurality of communication devices, said network devices being interconnected via said communication devices, said plurality of communication devices comprising:
      one or more devices of a first type having a plurality of ports and being arranged to store information regarding which of said network devices are associated with which of said ports and to re-transmit communications received at one of said ports only to the one or ones of the others or said ports necessary to enable the communication to reach its intended destination or destinations, and
      one or more devices of a second type having a plurality of ports and being arranged to store information regarding which of said network devices are associated with which of a selection of said ports except a designated one of said ports and to re-transmit communications received at one of said ports to the one or ones of the other of said ports necessary to enable to reach its intended destination of destinations and to said designated port if the intended destination or one of the intended destinations is unknown;
  the method comprising:
    determining the existence of a communication loop within said network; and
    causing one of the communication devices in said loop to break said loop by disabling reception and transmission via one of its ports forming part of said loops;
  wherein a communication device of said second type in said loop is caused to break said loop in preference to a communication device or devices of said first type in said loop.

Preferably the communication devices of the second type are communication devices as defined above.

It will therefore be seen that the present invention is directed to addressing the above problem of integrating a half bridge with the spanning tree algorithm. In broad terms the invention provides a method of configuring a half bridge such that it can function properly in a spanning tree environment and the method involves ensuring that a half bridge can always decide for itself which of its ports should be blocked if this is necessary and the method also permits the dynamic reconfiguration of the ports of a half bridge such that any port can be designated the backbone port.

BRIEF DESCRIPTION OF THE DRAWINGS

This invention will be better understood from the following description of the preferred embodiment given by way of example and with reference to the accompanying drawings in which.

DETAILED DESCRIPTION OF THE DRAWINGS

Figure 1:
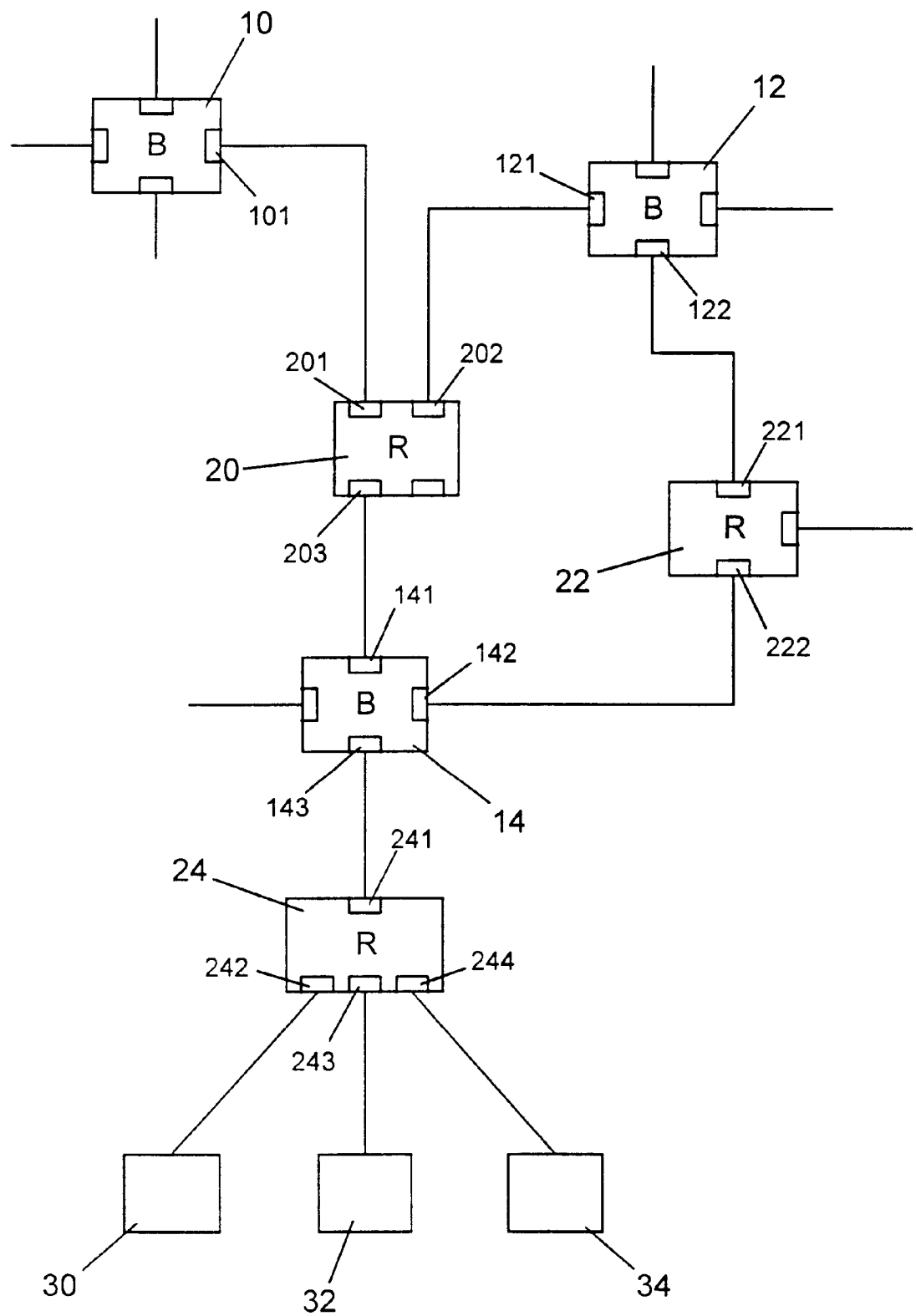
FIG. 1 illustrates a portion a computer network illustrating the operation of the spanning tree protocol.

FIG. 1 illustrates in diagrammatic form a portion of an example computer network on which discussion of this invention will be based. The illustrated portion of the computer network comprises a plurality of brides 10, 12, 14 designated "B" a number of repeaters 20, 22, 24 designated "R" and a plurality of end users 30, 32, 34 which may be computing devices, data servers or other well known components of computer networks.

As illustrated, users 30, 32, 34 are connected to ports 242, 243, 244 respectively of repeater 24. Another port 241 of repeater 24 is connected to port 143 of bridge 14. The bridges illustrated in FIG. 1 are normal full bridges and therefore have capability for learning on all of their ports which end user addresses are associated with which of their ports.

If, for example, user 30 wishes to send a communication to user 34, it will send a communication to port 242 of repeater 24. Repeater 24 will simply retransmit the received communication out of all of ports 241, 243 and 244. The communication will therefore reach its intended destination, user 34, by way of the retransmissions out of port 244. The communication will also reach bridge 14 via its port 143. However, the communication will not be forwarded further by bridge 14 as bridge 14 will be aware that user 34 is not associated with any of its other ports. This therefore prevents communications which are local to users 30 and 34 from being transmitted to the main part of the network unnecessarily.

As mentioned FIG. 1 illustrates only a portion of a computer network and as can be seen there are provided links to the rest of the network via the unmarked ports of bridges 10, 12 and 14 and repeater 22. If a user on the rest of the network wishes to communicate with any of users 30, 32 or 34 the communication will reach bridge 14 which will accordingly forward the communication out of its port 143. Repeater 24 will then repeat the communication to all of users 30, 32 and 34 enabling the communication to reach its intended destination.

As illustrated in FIG. 1 there is a redundant connection or loop present in the network. That is communications can travel between bridges 12 and 14 via either repeater 20 or repeater 22. When dealing with normal communications this does not cause a problem because, for example, bridge 14 will have stored in it the user addresses associated with bridge 12 relating to either of its ports 141 or 142 according to which of these two ports the users in question happen to communicate and according to the learning algorithm being implemented. As mentioned above, problems can arise in the case that a broadcast communication is put on the network.

Consider for instance the situation in which bridge 12 receives a broadcast communication. Being a broadcast signal the bridge 12 will retransmit the received communication on each of its other ports. The broadcast communication is therefore transmitted from bridge 12 on port 121. The broadcast communication is then received by repeater 20 on port 202 which repeats the communication out of its other ports including 203. Bridge 14 then receives the broadcast communication on port 141 and retransmits it out of its ports including port 142. Repeater 22 therefore receives the communication on port 222 and repeats it out of its other ports including port 221 meaning that bridge 12 receives the communication again on its port 122. Having received the broadcast signal bridge 12 retransmits it out of its other ports including port 121. The originally received broadcast signal will also have been retransmitted by bridge 12 out of port 122 and therefore will also be transmitted around the loop in the reverse direction.

A consideration of this scenario will show that not only does this mean the communication links forming the loop itself become choked with repeated transmissions of the broadcast communication but the broadcase communication is also repeatedly transmitted to repeater 24, to bridge 10 and to the remainder of the network. A single broadcast packet therefore can use up most if not all of the available communication bandwidth in the network rendering the network unusable for other communications. This is the problem which the known spanning tree protocol and algorithm addresses.

In the spanning tree protocol the ports of the bridges in a network can each be put into one of a number of different states. Firstly, a port may be designated as Forwarding. This stat is essentially the same as the state of a port in a normally operating bridge, that is communications can be received on the port and communications intended for destinations associated with that port can be transmitted. Secondly, a port can be designated Blocking. In this state the port does not transmit or receive any normal communications traffic. The only communications that a blocking port will send or receive are communications known as bridge protocol data units (BPDUs) which are essentially control communications which are addressed to the bridges themselves by network management.

The spanning tree protocol when implemented places a hierarchical structure on the bridges which form a network, in which one of the bridges is designated the "root bridge". All of the ports on the root bridge are put into the forwarding state such that the root bridge operates like a normal bridge. The ports in other bridges in the network are put in the forwarding state until such time as the spanning tree protocol detects a loop of the type discussed above. In FIG. 1 for instance bridge 12 may be designated the root bridge and therefore ports 121 and 122 are both put into forwarding state. At bridge 14 the loop is detected and it is established that ports 141 and 142 provide two routes to the same point i.e. bridge 12. According to the spanning tree protocol therefore one of ports 141 and 142 will be selected and put into the blocking state. This effectively cuts one of the communication paths to normal communication traffic, cutting the loop and removing the potential for the above discussed problem with broadcast signals to occur.

There are some other states into which bridge ports can be put in the spanning tree protocol, one of which is Learning. In this state a port can in addition to transmitting and receiving BPDUs, learn details of which user destinations are associated with the port. It can do this by looking at the communications which arrive at the port, but it does not actually transmit or receive any communications through the port. This port state is useful when the network is being reconfigured following a breakdown or a user implemented alteration to the configuration. In the above discussed example, it may be that the communication link between the port 141 of bridge 14 and port 203 of repeater 20 breaks. When the spanning tree protocol detects such a break it places all of the bridges in the network into a mode in which the stored addresses details are aged out very quickly and therefore it tends to be that all communication on the network are repeated throughout the network. Also, port 142 of bridge 14 is switched from the blocking state to the learning state. This enables bridge 14 to learn which user addresses it should now associate with port 142. After a period of time to enable sufficient addresses to learnt in this state, for instance 15 seconds, port 142 of bridge 14 is switched into the forwarding state and thus the redundant connection in the network is used to bypass the broken communication link.

Figure 2:
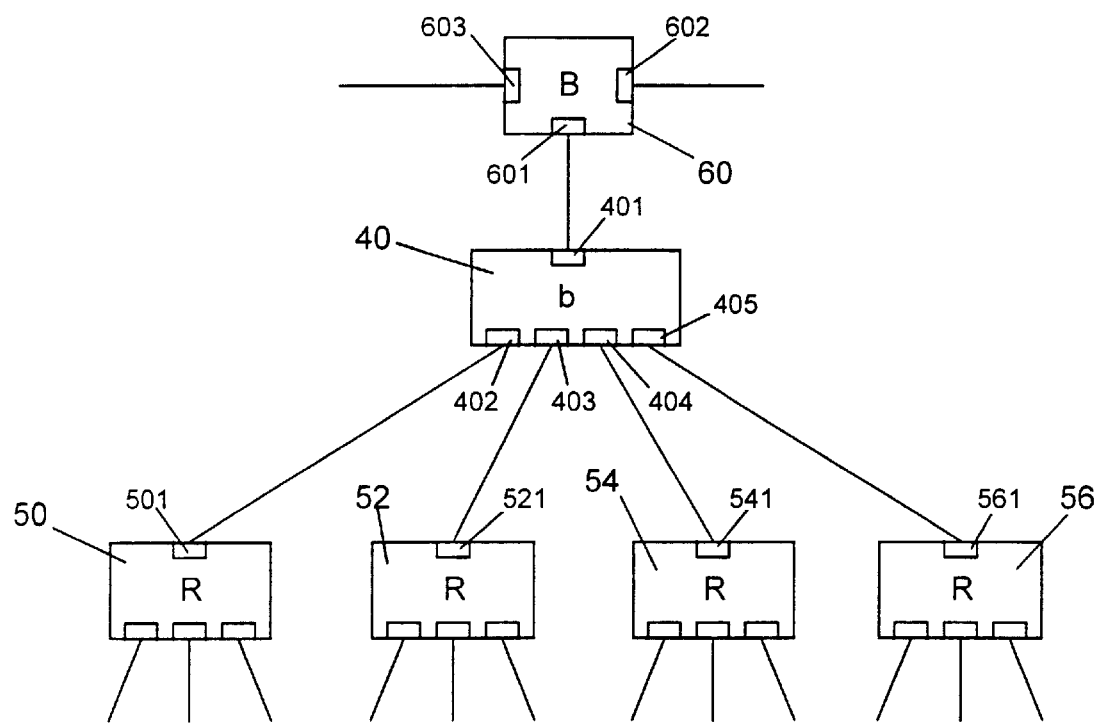
FIG. 2 illustrates the operation of a half bridge.

FIG. 2 illustrates the operation of a so called half bridge which was mentioned above. In FIG. 2 there is illustrated a half bridge "b" 40 having a plurality of communication ports 401 to 405. Of these ports, ports 402 to 405 are designated local ports and in the configuration illustrated in FIG. 2 each of these ports has attached to it a repeater 50, 52, 54, 56, to each of which may be connected a plurality of network users.

The other port 401 of half bridge 40 is designated the backbone or downlink port and provides the communication link to the remainder of the network, illustrated in FIG. 2 by bridge 60. The local ports 402, 405 of half bridge 40 function as normal ports of a bridge. That is, there is built up in association with each of ports 402 to 405 a database of users which are associated and can be reached via those ports. Therefore for instance port 402 will build up details of the network users connected to the network via repeater 50.

If half bridge 40 was in fact a normal bridge, port 401 would have to have associated with it a database potentially containing details of all of the users connected to the remainder of the network. Although this is necessary at some point in the network to achieve full network protocol compatibility, it has been found not necessary to do this at all locations and so in the half bridge 40 no effort is made to remember the users which are associated with port 401. Half bridge 401 therefore functions by sending out of port 401 communications addressed to all users which as far as it is concerned are unknown, on the basis of that such users will be in the remainder of the network. This arrangement considerably reduces the amount of memory required in half bridge 40 and therefore using such devices in at least some places in a network can reduce the overall cost of the network. The implementation of half bridges is described in others of our patent applications.

Figure 3:
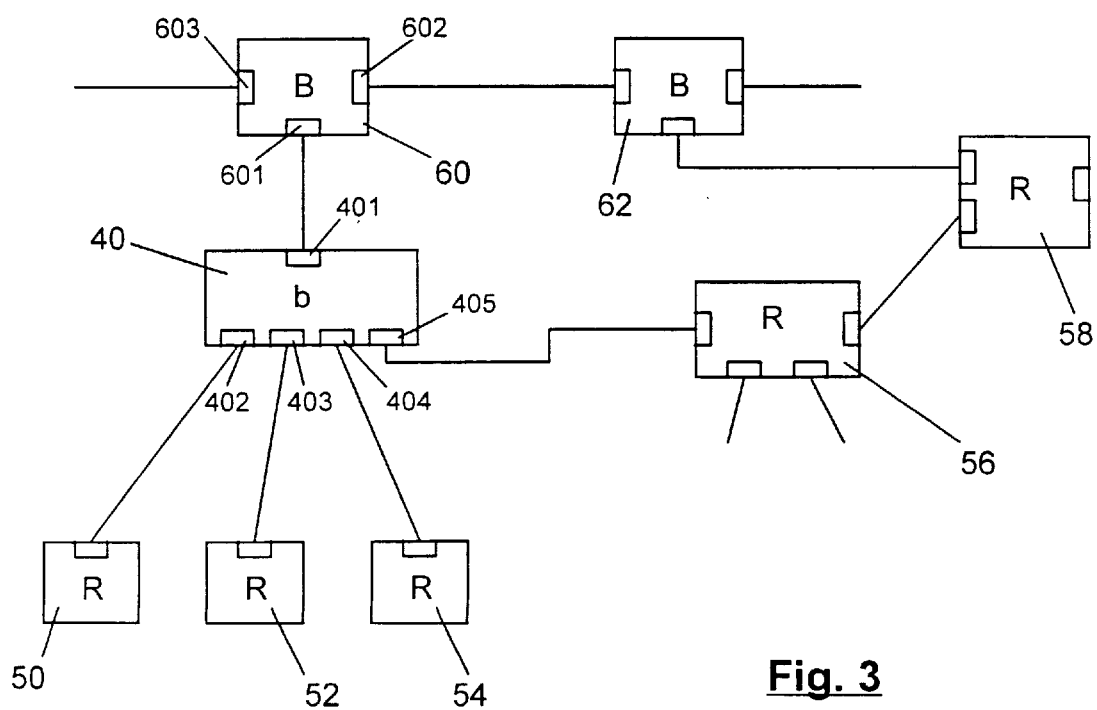
FIG. 3 illustrates the operation of the preferred embodiment of the present invention.

FIG. 3 illustrates the components illustrated in FIG. 2 in a particular configuration, in which unintentionally repeater 56 has been connected such that a loop including the backbone link out of port 401 of half bridge 40 is made. For the reasons discussed above the presence of such a loop is highly undesirable and therefore it would be advantageous to be able to implement the spanning tree protocol in the arrangement shown in FIG. 3 in order to eliminate the loop. However, it has been difficult to implement the spanning tree protocol in an arrangement and in FIG. 3 which includes a half bridge for the following reasons.

Firstly, in the spanning tree protocol it is possible that half bridge 40 would be selected as the root bridge of the network. This would mean that it would have to put all of its ports, including ports, 401 and 405 into the forwarding state. Bridge 60 would then detect that there was in existence a loop involving its two ports 601 and 602. It would then have to select one of these ports to put into the blocking state and, as far as bridge 60 is concerned there is no difference between 601 and 602, it is possible that bridge 60 would put its port 601 into the blocking state. This would leave half bridge 40 with its connection to the main part of the network being via port 405 which presents certain difficulties. Port 405 is, as mentioned above, configured as a local port and is therefore configured to learn all of the addresses associated with it. Port 405 therefore attempts to learn potentially all of the other addresses in the network but half bridge 40 does not have sufficient memory to cope with this. Any attempt to learn this number of addresses will cause problems in storing addresses associated with repeaters 50, 52 and 54 and therefore local communications via the half bridge 40 will be impaired. Also, if port 401 is configured as the backbone port of half bridge 40 it will normally be the case that the communication link out of this port will be a high bandwidth link enabling a large number of communications to take place. However, in the above described scenario it is this link which is discarded in favour of the lower bandwidth link via repeaters 56 and 58.

The present invention involves configuring half bridge 40 so that it is compatible with, or at least more likely to work with, the spanning tree protocol.

As a first stage, the bridge priority of half bridge 40 is set so that the spanning tree protocol is highly unlikely to choose it as the route bridge of the network. As a half bridge is commonly used, as illustrated, at the "edge" of a network to which users may be directly connected via only a repeater, this lowering of this bridge priority is entirely appropriate. This means that half bridge 40 will have the opportunity to detect the presence of the loop in FIG. 3 and will be able to select between its ports 401 and 405 to break the loop. Thus half bridge 40, knowing that port 401 provides its backbone connection to the remainder of the network, will choose port 405 to be placed into the blocking condition to achieve the spanning tree objective.

A second aspect of this invention enables the half bridge 40 also to operate properly as part of the reconfiguration following a breakdown of the backbone link between port 401 of half bridge 40 and port 601 of bridge 60. In particular, according to this invention half bridge 40 is configured to enable at least a plurality if not all of its ports to be configured as the backbone port.

If half bridge 40 detects that its downlink out of port 401 is disabled the spanning tree algorithm is potentially able to find a replacement backbone port. This port will be one which is currently in the blocking, one therefore the other ports of half bridge 40 are considered to find one which is in the blocking state and which can provide an alternative communication path to the downlink port, and one which can be configured as a backbone port. In the above scenario, the algorithm will establish that port 405 is a potentially useful port. However, it is not possible to simply switch 405 from the blocking state to the forwarding state, even via the learning state, because it is a local port and would therefore try to learn all of the addresses associated with it.

According to this invention therefore the designation of the ports of half bridge 40 is altered so that bridge 405 is now designated a backbone port in association with which no user addresses are learned. This means that port 405 can successfully be selected as the replacement port under the spanning tree algorithm, while half bridge 40 does not have to learn more addresses than it is designed for.

This invention therefore provides considerable advantages in terms of network compatibility and usefulness.

What is claimed is:

1. A method of controlling communication traffic in a computer network wherein said communication traffic comprises data packets including destination addresses and said network includes a plurality of multi-port communication devices and said plurality of multi-port communication devices includes at least one bridge which has a multiplicity of respective ports and in respect of each of the respective ports is operative to learn destination addresses, said plurality of multi-port communication devices including at least one half-bridge which has a multiplicity of respective ports including a backbone port and in respect of said respective port except said backbone port is operative to learn destination addresses, said method comprising:

(a) determining the existence of a communication loop including ports of said at least one bridge and both said backbone port and a different one of the respective ports of the half-bridge;

(b) causing said half-bridge to break said communication loop in preference to said at least one bridge; and (c) causing said half-bridge to break said communication loop by disabling reception and transmission of packets by said different one of said respective ports on the said half-bridge.

\* \* \* \* \*